Nov. 18, 1941.    W. L. WEEKS    2,263,478
WIRE AND SHELL HOSE CLAMP

Filed Aug. 28, 1940

INVENTOR
Walter L. Weeks.
BY
ATTORNEY

Patented Nov. 18, 1941

2,263,478

UNITED STATES PATENT OFFICE 2,263,478

WIRE AND SHELL HOSE CLAMP

Walter L. Weeks, Glen Rock, N. J., assignor to Wright Aeronautical Corporation, a corporation of New York Application August 28, 1940, Serial No. 354,530

12 Claims. (Cl. 24—19)

This invention relates to hose clamps. An object of the invention is to provide a firm hose clamp whose clamping action depends upon the turning of one element of the hose clamp upon another element.

A further object of the invention is to provide a two-piece hose clamp which may be readily assembled or removed from a hose, which will be tight and effective in service, and which will be free from the likelihood of inadvertent loosening during usage.

Further objects of the invention will be noted in connection with the description below considered in view of the drawing, in which.

Figure 1:
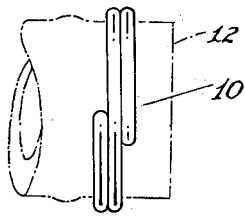
Fig. 1 is a side elevation of one element of the clamp assembled on a hose.
Figure 2:
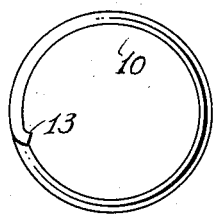
Fig. 2 is an end elevation of the element of Fig. 1.
Figure 3:
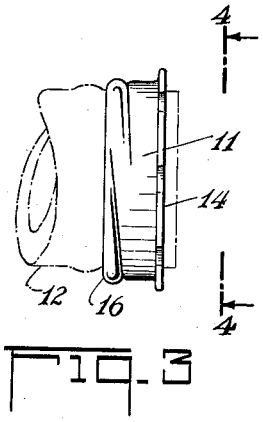
Fig. 3 is a side elevation of the second element of the hose clamp.
Figure 4:
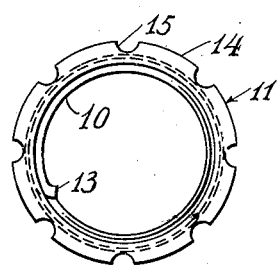
Fig. 4 is a view on the line 4—4 of Fig. 3 showing the two elements of the clamp in assembled relation, the hose element being omitted.
Figure 5:
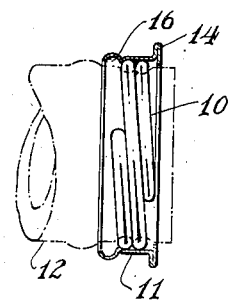
Fig. 5 is a side elevation of the clamp assembly showing the outer element in section.

The hose clamp comprises a wire coil element 10 embraced by a nut or sleeve element 11, the wire element 10 preferably being made from a malleable wire of steel, brass, or other material, which is wrapped around a hose indicated at 12. About two turns of wire around the hose is deemed to be sufficient, and the wire ends 13 are slightly inturned to provide spurs which bite into the elastic material of the hose. The sleeve element 11 consists of a piece of metal tubing one end of which is upset at 14 to provide a flange having notches 15 formed in its periphery by which the sleeve may be easily rotated. The other end of the sleeve is provided with approximately one turn of an internal thread, this thread being shown at 16 and being formed predominantly outwardly from the inner bore of the initial tube from which the sleeve 11 is formed. The thread 16, in fact, is tapered from a large diameter at its end to the smaller diameter of the tube bore, whereat the thread disappears. The effective inside diameter of the open end of the thread is such that it will freely engage the wire coil 10 initially and, as the sleeve 11 is screwed over the coil, the lever is forced into the hose, thus compressing it against the pipe or tube within the hose.

The spurs 13 insure against rotative slipping of the wire coil during assembly while the compression of the sleeve 11 against the coil will prevent inadvertent loosening of the sleeve in operation.

When the clamp is to be disassembled, the sleeve 11 is unscrewed from the coil and during this operation, the inwardly bent end 13 of one end of the coil will serve to prevent unwrapping of the coil which, if it occurred, would inhibit easy removal of the sleeve due to the unwrapping tendency which the coil might have.

It will be noted that the coil 10 alone does not serve as a clamp since the material of the coil has little or no spring action. It is the sleeve 11 which serves to compress the turn of the coil 10 to provide firm engagement thereof with the hose upon which the clamp is assembled.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A clamp for assembly upon an elastic hose comprising a wire coil wrapped around the hose to comprise, in effect, a screw thread, and an internally taper-threaded sleeve screwed over the coil to press the latter into the hose.

2. A hose clamp comprising a helical coil of wire wrapped around the hose to comprise screw threads and an internally threaded sleeve screwed over said coil and pressing the coil wire into the hose.

3. A hose clamp comprising a helical coil of wire wrapped around the hose to comprise screw threads and an internally threaded sleeve screwed over said coil and pressing the coil wire into the hose, the ends of said coil being in-turned to bite into the hose material.

4. A hose clamp comprising a helical coil of yielding wire wrapped around the hose to comprise screw threads having the wire ends inturned to comprise spurs, and an internally threaded sleeve screwed upon said wire coil.

5. A hose clamp comprising a helical coil of yielding wire wrapped around the hose to comprise screw threads having the wire ends inturned to comprise spurs, and an internally threaded sleeve screwed upon said wire coil, said sleeve comprising a metallic tube having the threads upset outwardly in the tube material from the tube bore.

6. A hose clamp comprising a helical coil of yielding wire wrapped around the hose to comprise screw threads having the wire ends inturned to comprise spurs, and an internally threaded sleeve screwed upon said wire coil, said sleeve comprising a metallic tube having the threads upset outwardly in the tube material from the tube bore and said threads being tapered from large effective diameter at one end of the sleeve to die out at an intermediate portion of the sleeve.

7. A hose clamp comprising a wire helix and an internally taper-threaded sleeve screwed thereover.

8. A hose clamp comprising a wire helix and an internally taper-threaded sleeve screwed thereover, said sleeve comprising a tube flanged at one end and having the threads upset from the tube material at its other end.

9. A hose clamp comprising a wire helix and an internally taper-threaded sleeve screwed thereover, said sleeve comprising a tube flanged at one end and having the threads upset from the tube material at its other end, and means on said flange to provide a grip for turning the sleeve upon the helix.

10. A hose clamp comprising a wire helix wrapped around a hose, the wire ends being turned inwardly to provide spurs which may bite into the hose material, and a tube having an inside diameter less than the outside diameter of the helix when loosely wrapped upon the hose, one end of said tube being tapered outwardly to engage the loosely wrapped helix, and means to force the sleeve over the helix to compress the latter against the hose.

11. A hose clamp comprising a wire helix wrapped around a hose, the wire ends being turned inwardly to provide spurs which may bite into the hose material, and a tube having an inside diameter less than the outside diameter of the helix when loosely wrapped upon the hose, one end of said tube being tapered outwardly to engage the loosely wrapped helix, and means to force the sleeve over the helix to compress the latter against the hose, said latter means comprising screw threads in the sleeve bore engageable with said helix.

12. A hose clamp comprising a yielding wire wrapped around the hose to comprise a helix, and a taper-threaded nut having a thread pitch equal to the pitch of the helix, screwed upon the helix, the nut taper serving to progressively compress the wire of the helix into the hose material.

WALTER L. WEEKS.